United States Patent

Huang

(10) Patent No.: US 12,493,688 B1
(45) Date of Patent: Dec. 9, 2025

(54) ZERO-HALLUCINATION SPECIALIZED LARGE LANGUAGE MODEL SEARCH

(71) Applicant: Anomali Incorporated, Redwood City, CA (US)

(72) Inventor: Wei Huang, Los Altos Hills, CA (US)

(73) Assignee: Anomali Incorporated, Redwood City, CA (US)

( * ) Notice: Subject to any disclaimer, the term of this patent is extended or adjusted under 35 U.S.C. 154(b) by 0 days.

(21) Appl. No.: 19/041,897

(22) Filed: Jan. 30, 2025

Related U.S. Application Data

(60) Provisional application No. 63/723,772, filed on Nov. 22, 2024, provisional application No. 63/723,790, filed on Nov. 22, 2024.

(51) Int. Cl.
| | |
|---|---|
| *G06F 7/00* | (2006.01) |
| *G06F 16/242* | (2019.01) |
| *G06F 16/248* | (2019.01) |
| *G06F 21/55* | (2013.01) |

(52) U.S. Cl.
CPC .......... *G06F 21/552* (2013.01); *G06F 16/243* (2019.01); *G06F 16/248* (2019.01); *G06F 2221/034* (2013.01)

(58) Field of Classification Search
CPC ................. G06F 16/243; G06F 16/248; G06F 16/24522; G06F 16/3344; G06F 16/90332; G06F 16/9535; G06F 16/2228; G06F 16/951; G06F 21/552; G06F 21/563; G06F 21/565; G06F 21/554; G06F 21/566; G06F 21/562; G06F 2221/034; G06F 2221/033
See application file for complete search history.

(56) References Cited

U.S. PATENT DOCUMENTS

| | | | |
|---|---|---|---|
| 2018/0137401 A1* | 5/2018 | Kumar | G06F 16/245 |
| 2019/0065744 A1* | 2/2019 | Gaustad | G06F 21/562 |
| 2020/0067965 A1* | 2/2020 | Dada | H04L 63/1433 |
| 2021/0081415 A1* | 3/2021 | Clarke | G06F 16/24534 |
| 2025/0016183 A1* | 1/2025 | Sergeev | H04L 63/1441 |

\* cited by examiner

*Primary Examiner* — Mohammad A Sana
(74) *Attorney, Agent, or Firm* — Fenwick & West LLP

(57) ABSTRACT

Systems and methods are disclosed herein for receiving, based on user interaction with a user interface, a user input of a natural language search query for identifying a cybersecurity threat by way of a search interface, the natural language search query requesting a specialized search of a threat database. An application generates a search vocabulary based on the natural language search query. The application performs a query lookup using the threat database, the query lookup returning a plurality of files that at least partially match the search query. The application prompts a large language model to generate an answer to the natural language search query using the plurality of files that at least partially match the search query, and outputs for display the answer using the user interface.

20 Claims, 7 Drawing Sheets

420

What is lockbit 3.0?

LockBit 3.0 (also known as LockBit Black) is the latest version of the LockBit ransomware-as-a-service (RaaS) developed and operated by the LockBit group. LockBit 3.0 was released in March 2022 and includes several new features and capabilities compared to previous versions.

- It is a Windows locker that encrypts files on infected systems.
- LockBit 3.0 added a Linux/ESXI locker version 1.0 to target additional operating systems.
- The group also developed the StealBit infostealer tool to enable double extortion tactics, where stolen data is threatened to be leaked if the ransom is not paid.
- In 2022, LockBit announced a bug bounty program that offers financial incentives for finding information about the group's managers, reporting vulnerabilities, and proposing new ransomware features. This was the first time a ransomware group publicly announced such a program. 

Time Saved: 15 minutes and 44 seconds of reading

Sources

510 — Receive, based on user interaction with a user interface, a user input of a natural language search query for identifying a cybersecurity threat by way of a search interface, the natural language search query requesting a specialized search of a threat database 520 — Generate a search vocabulary based on the natural language search query 530 — Perform a query lookup using the threat database, the query lookup returning a plurality of files that at least partially match the search query 540 — Prompt a large language model to generate an answer to the natural language search query using the plurality of files that at least partially match the search query 550 — Output for display the answer using the user interface

*FIG. 5*

ZERO-HALLUCINATION SPECIALIZED LARGE LANGUAGE MODEL SEARCH

CROSS REFERENCE TO RELATED APPLICATIONS

This application claims the benefit of priority to U.S. Provisional Patent Application Nos. 63/723,772, 63/723,790, and 63/723,794, filed on Nov. 22, 2024, which are incorporated herein by reference in their entirety for all purposes.

TECHNICAL FIELD

This disclosure generally relates to machine learning, and more particularly relates to an improved task distribution and user interface for natural language searches performed by large language models.

BACKGROUND

Traditional natural language search tools query large databases having vast amounts of information. Only after the trove of information is fully processed is a result output by a large language model. This results in a waste of processing power and computational expense, as myriad files are searched that are irrelevant to the user's search request. Moreover, this results in hallucinations, where semantically similar but nevertheless incorrect data is produced as a result of the search. The hallucination problem compounds, because it is not easy to verify how a large language model reached its result, thus forcing further natural language queries to confirm that in turn consume massive processing power.

Furthermore, due to constraints in an amount of data that Cloud Service Providers (CSPs) can process, the trove of data traditionally must be extracted from and processed by data centers, which itself poses inefficiencies, in that the data centers must provide capacity for huge transfers of data, even though that capacity goes unused most of the time. That is, requests for searching through external sources by a CSP may be rejected where a load of the request exceeds a size, which may be the case when a search through millions, billions, or trillions (or more) of files is received. This may be the case because a given cluster to which tasks may be allocated may have finite capacity.

An inability to rely on CSPs inhibits natural language search performance because advantages that CSPs provide are not able to be realized. For example, cloud service providers have massive reliability due to redundant systems, low latency, and virtually unlimited scalability (e.g., due to usage of spot instances, on-demand compute capacity, and so on). Traditional data centers and on-prem solutions, on the other hand, suffer reliability constraints and latency constraints (e.g., where data centers that are geographically far apart need to intercommunicate in order to process a request). Cloud service providers are not traditionally used for search in the manner described herein at least because of their load limitations.

SUMMARY

The systems and methods disclosed herein divide the task into one or more traditional search queries on a specialized database. Returned files that match the search queries are then fed into a large language model to produce a result with a closed universe of the initially found files from the search task. This dramatically reduces the load required for processing by the large language model, enabling use of CSPs to perform the search. Moreover, hallucinations are eliminated because the universe is closed to a specialized database pertaining to the search. Semantic similarity computations are reduced dramatically, resulting in improved computational efficiency. Yet further, the systems and methods disclosed herein provide an improved user interface that shows the portions of the files used to derive the output of the large language model, thereby enabling a user to trust the output of the large language model and verify the zero-hallucination output.

In some embodiments, a specialized search tool receives, based on user interaction with a user interface, a user input of a natural language search query for identifying a cybersecurity threat by way of a search interface, the natural language search query requesting a specialized search of a threat database. The specialized search tool generates a search vocabulary based on the natural language search query. The specialized search tool performs a query lookup using the threat database, the query lookup returning a plurality of files that at least partially match the search query. The specialized search tool prompts a large language model to generate an answer to the natural language search query using the plurality of files that at least partially match the search query, and outputs for display the answer using the user interface.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 4A-4C illustrate a sequence of user interfaces as natural language search is performed and explainability is presented, in accordance with an embodiment.

FIG. 5 illustrates a flowchart of a process for using a specialized database precedent to calling a large language model to satisfy a natural language search.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
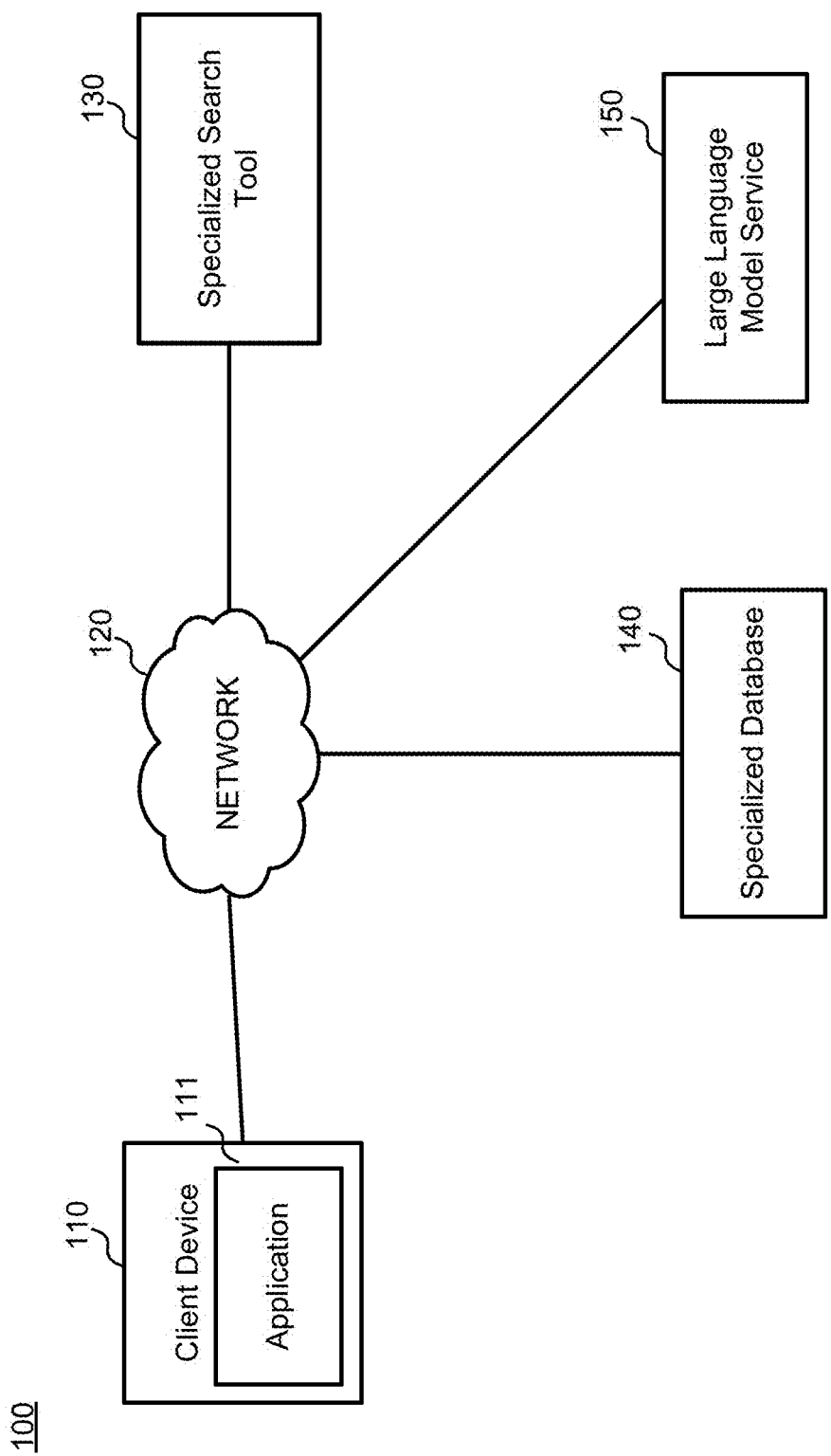
FIG. 1 illustrates one embodiment of a system environment for implementing a specialized search tool, in accordance with an embodiment.

FIG. 1 illustrates one embodiment of a system environment for implementing a specialized search tool, in accordance with an embodiment. As depicted in FIG. 1, environment 100 includes various devices, including client device 110, network 120, specialized search tool 130, specialized database 140, and large language model service 150. A tool, as used herein, is a collection of one or more cloud resources that together, perhaps in coordination with other entities such as application 111, form a client-facing tool.

Specialized search tool 130 is used by client devices 110 to perform searches for natural language queries input by users and provide results (e.g., in real-time as partial results are obtained). Client device 110 may, by way of application 111, interface with specialized search tool 130. Application 111 is an application installed on client device 110 and/or accessible by way of a browser of client device 110. Some or all functionality of specialized search tool 130 described herein may be distributed or fully performed by application 111 on a client device, or vice versa. Where reference is made herein to activity performed by application 111, it equally applies that specialized search tool 130 may perform that activity off of the client device, and vice versa. Further details about the operation of specialized search tool 130 are described below with reference to FIG. 2.

Network 120 may be any network or combination of networks, such as the Internet, a wireless and/or wired network, a local area network, a wideband network, or any other data communications means that facilitates communications between devices, services, and sources disclosed herein.

Specialized database 140 includes data sources used by specialized search tool 130 in order to find relevant files for the LLM to search. This may include specialized databases, such as a threat intelligence database storing data relating to known threats. While specialized database 140 is depicted as external to specialized search tool 130, where referenced, internal sources may also be analyzed that are stored within the set of servers that form specialized search tool 130. Large language model service 150 may be any service or combination of services that provide large language models (e.g., OpenAI, Llama3, etc.). In some embodiments, specialized search tool 130 may have its own internal large language model service 150 and need not use an external large language model service.

Figure 2:
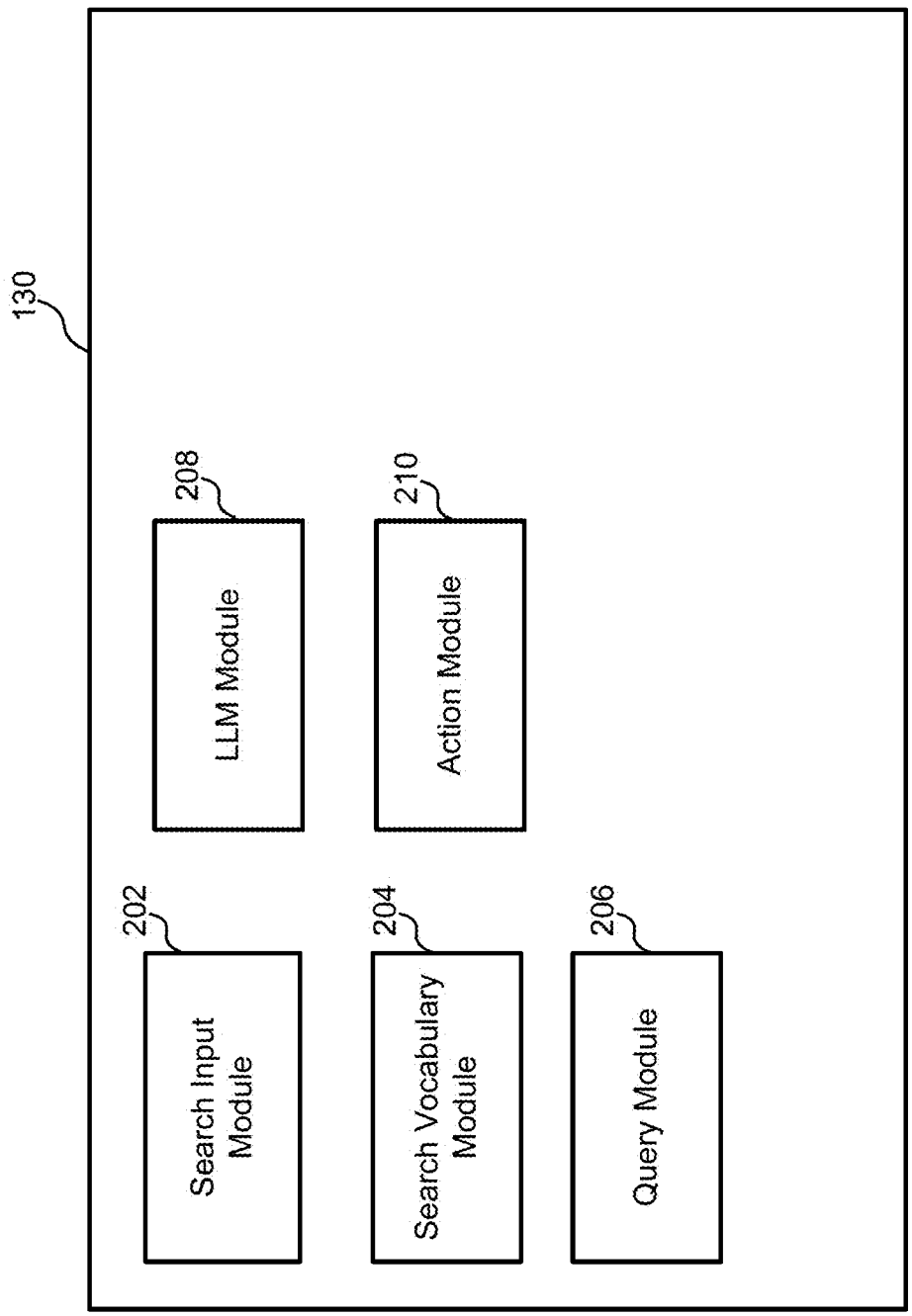
FIG. 2 illustrates one embodiment of exemplary modules of the specialized search tool, in accordance with an embodiment.

FIG. 2 illustrates one embodiment of exemplary modules of the specialized search tool, in accordance with an embodiment. As depicted in FIG. 2, specialized search tool 130 includes search input module 202, search vocabulary module 204, query module 206, LLM module 208, and action module 210. The modules depicted in FIG. 2 are merely exemplary, and fewer or more modules may be used by specialized search tool 130 to achieve the functionality disclosed herein.

Search input module 202 receives, based on user interaction with a user interface, a user input of a natural language search query for identifying information relating to a specialized set of knowledge. For example, the natural language search query may relate to identifying a cybersecurity threat. The user interface may be a specialized user interface, such as a user interface indicating that searches may be performed for something specific (e.g., a user interface displaying one or more options to a user to obtain information on cybersecurity threats). In some embodiments, the user interface may be generic, and the search query itself may include natural language indicating that a specialized search is requested.

The natural language search query may request a specialized search of a threat database. This may be hardwired (e.g., the user interface indicates that a specialized database will be searched), or may be requested explicitly by user input into the user interface (e.g., a natural language query indicating to search within a particular database). The example of threat hunting or learning about cybersecurity threats is used throughout this specification, but is not meant to be limiting. Natural language searches relating to anything, such as knowledge about medicine, law, or anything else, may be requested. Similarly, references to a threat database are made throughout this specification, but any specialized database (e.g., a database specialized to a specific medical condition and data pertaining thereto) is within the scope of this disclosure.

In some embodiments, search input module 202 includes selectable options (e.g., within a drop down menu or icons on a landing page) for selecting one or more specialized databases to be searched, or representations of those specialized databases (e.g., selectable options relating to cybersecurity, fraud, etc., any of which may be selected). Responsive to receiving a selection, a search query is processed with respect to the selected specialized database(s).

In some embodiments, specialized search tool 130 may offer functionality relating to threat detection and intelligence, where threats are detected, logged, and remediated by specialized search tool 130. In such cases, specialized search tool 130 may populate specialized database 140 with information relating to each case. Over time (e.g., months, years, decades), specialized database 140 may become a repository of vast amounts of information pertaining to threat detection and intelligence, offering first-party verified and accurate information. This may be the case for any other service that logs information pertaining to a subject over time and eventually yields a specialized database.

In some embodiments, input of the search query may be a selection of a natural language search query from a plurality of recommendations of candidate search queries displayed using the user interface. For example, common queries for a group of which the user is a part or trending queries may be pre-populated as selectable options to initiate a search.

Search vocabulary module 204 generates a search vocabulary based on the natural language search query by expanding the initial natural language query. To expand the initial search query, search vocabulary module 204 may extract a set of keywords from the natural language query. The keywords may be extracted using any natural language processing model programmed to isolates keywords (e.g., by removing articles, conjunctions, etc.). Each keyword is then expanded by search vocabulary module 204. In some embodiments, to generate the search vocabulary, search vocabulary module 204 prompts a large language model to expand each keyword by returning synonyms and semantically similar terms to each keyword within the search query, where the returned information forms an expanded set of keywords. In some embodiments, search vocabulary module 204 generates a search vocabulary by heuristically determining synonyms to each keyword and adding each synonym to the query (e.g., by referencing a thesaurus database).

Query module 206 performs a query lookup using specialized database 140, the query lookup returning a plurality of files that at least partially match the search query. Query module 206 may perform a search for files having keywords that match the search vocabulary. This is not a large language model search, and instead is a traditional database lookup. Files may be returned in whole or in part (e.g., truncated to portions having matching keywords, optionally with a threshold amount of buffer text above and/or below the matching keywords (e.g., a threshold number of sentences, paragraphs, pages, etc.). In some embodiments, query module 206 receives files that at least partially match the search query, and prompts a large language model to filter for portions of the files that are relevant to the search query.

LLM module 208 prompts a large language model to generate an answer to the natural language search query using the plurality of files that at least partially match the search query. Advantageously, this severely limits the search universe for the LLM, massively improving computational efficiency, reducing latency in LLM processing, and removing any possibility of hallucinations as compared to a traditional LLM search. Action module 210 may then output for display the answer using the user interface.

In some embodiments, action module 210 may additionally initiate a remediation for an identified cybersecurity threat. For example, a user may initiate a natural language query asking whether a vulnerability exists given a certain set of facts. Action module 210 may determine, in addition to the answer, that remediation is available (e.g., the vulnerability exists, and a solution to the vulnerability exists as well). In some embodiments, action module 210 accesses entity data to determine whether a remediation is available. For example, in the cybersecurity context, action module 210 may access a network topography for a group of machines associated with the entity of the searching user, and may determine that a fix to the cybersecurity problem searched for can be performed on certain machines by installing software patches.

In an embodiment, action module may automatically execute the remediation. In an embodiment, action module 210 may output for display a recommendation to perform the remediation. As mentioned in the foregoing, specialized search tool may be part of a broader suite of tools including a threat detection tool. The threat detection tool may be plugged in (e.g., via various APIs) to a network topography of an entity in order to manage cybersecurity protection. Remediation may be performed based on such plugins and knowledge of the network topography of the entity.

In some embodiments, along with an answer, action module 210 may output for display one or more of a visualization of the query lookup and a visualization of at least a portion of the plurality of files. This may include display of the expanded search terms and/or the query used to identify the files, and the files themselves. This may also include indicia of where attention was applied within the files by the LLM in order to yield the answer. The query visualization and/or the files may be selectable (e.g., in order to directly access the files and expand a shorter form of the query).

In some embodiments, different portions of the answer are annotated with different selectable options. Each of the selectable options is associated with where attention was applied within the files by the LLM in order to yield that part of the answer. That is, different portions of the answer may be informed by different files.

LLM usage for providing solutions to critical activity such as cybersecurity threats tends to be problematic, as LLM outputs are not explainable. Limiting the search to a specialized database eliminates risk of bias, and the activity of action module 210 provides explainability with quick reference to material informing the answer, thereby enabling adoption of LLM in mission-critical scenarios by proving reliability, thus solving the explainability problem.

Computing Machine Architecture

Figure 3:
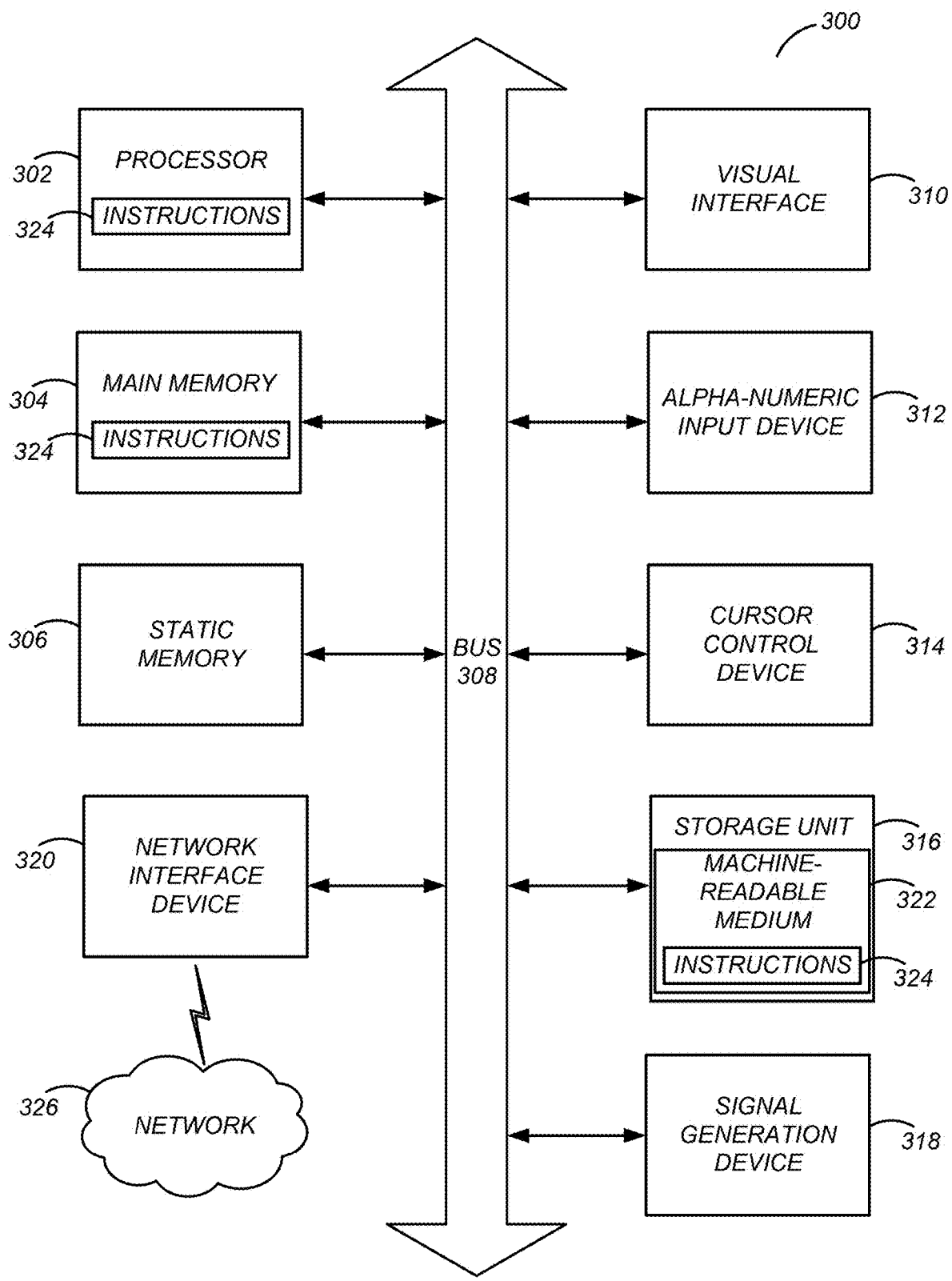
FIG. 3 is a block diagram illustrating components of an example machine able to read instructions from a machine-readable medium and execute them in a processor (or controller).

FIG. (Figure) 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alphanumeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for implementing an explainable and efficient natural language search tool through specialized databases through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Exemplary Use Cases

Figure 4A:
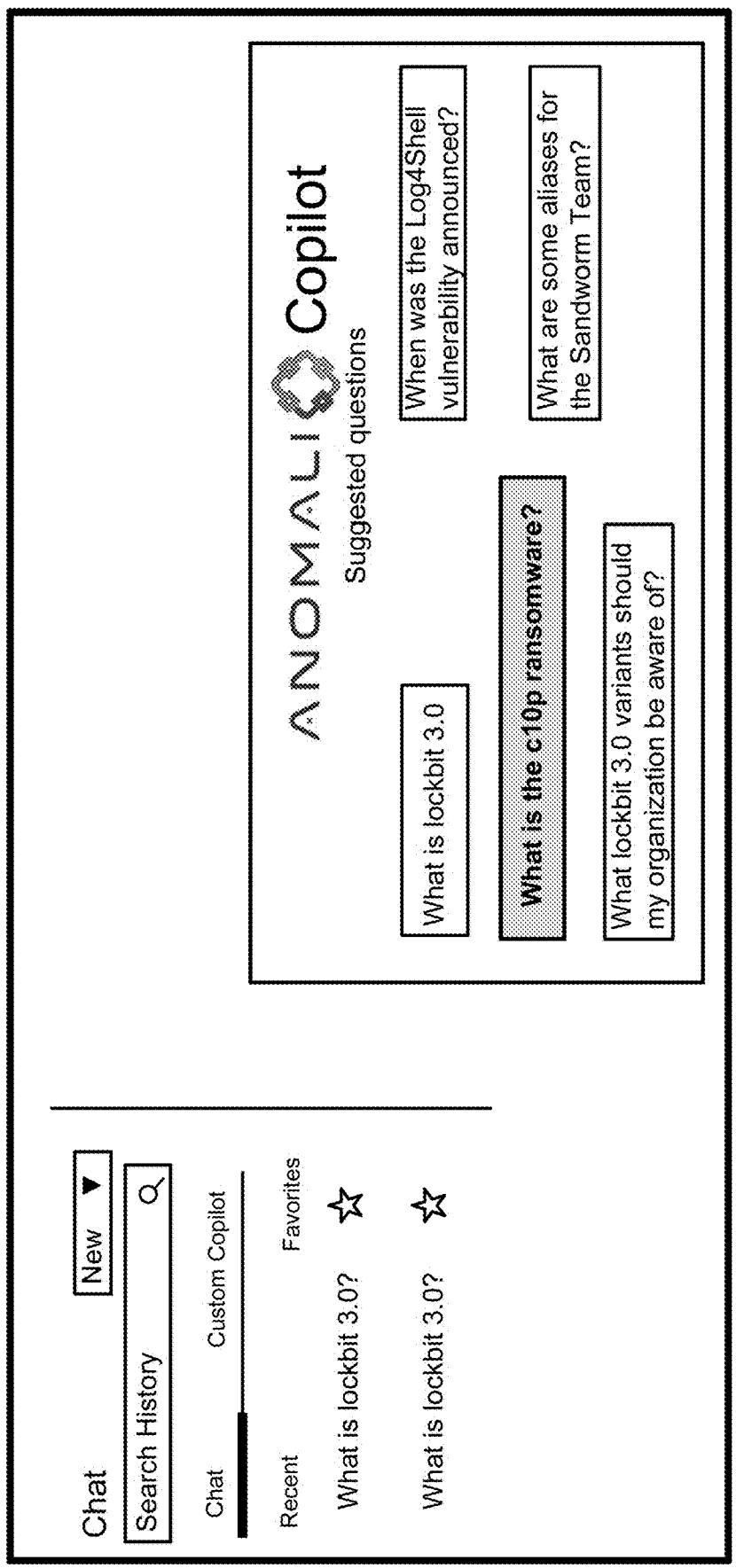
Figure 4C:

FIGS. 4A-4C illustrate a sequence of user interfaces as natural language search is performed and explainability is presented, in accordance with an embodiment. As illustrated in FIG. 4A, user interface 410 includes a search query input interface in the top left corner, and includes recommendations of natural language queries as selectable options, that when selected, trigger a natural language search (e.g., "what is lockbit 3.0?"). Turning to FIG. 4B, when a natural language search is received using user interface 420 (e.g., either typed in or selected from a pre-drafted recommendation), a large language model is used to answer the query. A "Sources" option at the bottom, when selected, reveals how the answer was obtained.

Turning to FIG. 4C, to perform this query, a "threat model query" was first generated. The threat model query is generated by expanding the search terms, and is used to query a specialized database for files matching the expanded search terms using a traditional query search. The matching files (or portions thereof) are also revealed as selectable options in user interface 430, where a user may access each piece of source material. The files may be annotated to show where more or less attention was applied by the LLM to reach the answer. Representations of these files are shown beneath the expanded search terms.

FIG. 5 illustrates a flowchart of a process for using a specialized database precedent to calling a large language model to satisfy a natural language search. Process 500 is executed by modules using one or more processors of specialized search tool 130 to execute instructions stored in non-transitory media (e.g., as shown in FIG. 3). Process 500 begins with specialized search tool 130 receiving 510, based on user interaction with a user interface, a user input of a natural language search query for identifying a cybersecurity threat by way of a search interface, the natural language search query requesting a specialized search of a threat database (e.g., using search input module 202). Search tool 130 generates 520 a search vocabulary based on the natural language search query (e.g., using search vocabulary module 204).

Search tool 130 performs 530 a query lookup using the threat database, the query lookup returning a plurality of files that at least partially match the search query (e.g., using query module 206 to perform a traditional query). Search tool 130 prompts 540 a large language model to generate an answer to the natural language search query using the plurality of files that at least partially match the search query (e.g., using LLM module 208), and outputs 550 for display the answer using the user interface (e.g., using action module 210).

What is claimed is:

1. A method comprising:
   receiving, based on user interaction with a user interface, a user input of a natural language search query for identifying a cybersecurity threat by way of a search interface, the natural language search query requesting a specialized search of a threat database;
   generating a search vocabulary based on the natural language search query;
   reducing a corpus of files within the threat database to a reduced corpus for a large language model to process by performing a query lookup using the threat database, the query lookup returning a plurality of files that at least partially match the search query, the plurality of files that at least partially match the search query populating the reduced corpus to the exclusion of other files in the threat database;
   prompting a large language model to generate an answer to the natural language search query using only the reduced corpus; and
   outputting for display the answer using the user interface.

2. The method of claim 1, wherein the user interaction comprises a selection of the natural language search query from a plurality of recommendations displayed using the user interface.

3. The method of claim 2, wherein the user interaction comprises input of text comprising the natural language search query by the user.

4. The method of claim 1, wherein generating the search vocabulary based on the natural language search query comprises:
   extracting a set of keywords from the natural language search query;
   expanding the set of keywords to include additional expansion keywords from a keyword expansion repository; and
   using the expanded set of keywords as the search vocabulary.

5. The method of claim 1, wherein the threat database is generated by monitoring cybersecurity threats over time and generating entries having monitored data for each cybersecurity threat.

6. The method of claim 5, wherein the threat database is generated by a same entity that provides the user interface.

7. The method of claim 1, wherein outputting for display the answer further comprises initiating a remediation for an identified cybersecurity threat.

8. The method of claim 1, wherein outputting for display the answer using the user interface further comprises outputting for display one or more of a visualization of the query lookup and a visualization of at least a portion of the plurality of files.

9. The method of claim 8, wherein the visualization of the query lookup and/or the visualization of the at least the portion of the plurality of files is selectable.

10. A non-transitory computer-readable medium comprising memory with instructions encoded thereon that, when executed by one or more processors, cause the one or more processors to perform operations, the instructions comprising instructions to:
    receive, based on user interaction with a user interface, a user input of a natural language search query for identifying a cybersecurity threat by way of a search interface, the natural language search query requesting a specialized search of a threat database;
    generate a search vocabulary based on the natural language search query;
    reduce a corpus of files within the threat database to a reduced corpus for a large language model to process by performing a query lookup using the threat database, the query lookup returning a plurality of files that at least partially match the search query, the plurality of files that at least partially match the search query populating the reduced corpus to the exclusion of other files in the threat database;
    prompt a large language model to generate an answer to the natural language search query using only the reduced corpus; and
    output for display the answer using the user interface.

11. The non-transitory computer-readable medium of claim 10, wherein the user interaction comprises a selection of the natural language search query from a plurality of recommendations displayed using the user interface.

12. The non-transitory computer-readable medium of claim 11, wherein the user interaction comprises input of text comprising the natural language search query by the user.

13. The non-transitory computer-readable medium of claim 10, wherein the instructions to generate the search vocabulary based on the natural language search query comprise instructions to:
    extract a set of keywords from the natural language search query;
    expand the set of keywords to include additional expansion keywords from a keyword expansion repository; and
    use the expanded set of keywords as the search vocabulary.

14. The non-transitory computer-readable medium of claim 10, wherein the threat database is generated by monitoring cybersecurity threats over time and generating entries having monitored data for each cybersecurity threat.

15. The non-transitory computer-readable medium of claim 14, wherein the threat database is generated by a same entity that provides the user interface.

16. The non-transitory computer-readable medium of claim 10, wherein the instructions to output for display the answer further comprise instructions to initiate a remediation for an identified cybersecurity threat.

17. The non-transitory computer-readable medium of claim 10, wherein the instructions to output for display the answer further comprise instructions to output for display one or more of a visualization of the query lookup and a visualization of at least a portion of the plurality of files.

18. The non-transitory computer-readable medium of claim 17, wherein the visualization of at least one of the query lookup and the visualization of the at least the portion of the plurality of files is selectable.

19. A system comprising:
    memory with instructions encoded thereon; and
    one or more processors that, when executing the instructions, are caused to perform operations comprising:
      receiving, based on user interaction with a user interface, a user input of a natural language search query for identifying a cybersecurity threat by way of a search interface, the natural language search query requesting a specialized search of a threat database;

generating a search vocabulary based on the natural language search query;

reducing a corpus of files within the threat database to a reduced corpus for a large language model to process by performing a query lookup using the threat database, the query lookup returning a plurality of files that at least partially match the search query, the plurality of files that at least partially match the search query populating the reduced corpus to the exclusion of other files in the threat database;

prompting a large language model to generate an answer to the natural language search query using only the reduced corpus; and outputting for display the answer using the user interface.

20. The system of claim 19, wherein the user interaction comprises a selection of the natural language search query from a plurality of recommendations displayed using the user interface.

* * * * *